United States Patent [19]

Duke et al.

[15] 3,643,694
[45] Feb. 22, 1972

[54] AQUARIUM GANG VALVE

[72] Inventors: Bernard Duke, Deal, N.J.; David Z. Levensohn, New York, N.Y.

[73] Assignee: Miracle Pet Products, Inc., Jersey City, N.J.

[22] Filed: Nov. 10, 1969

[21] Appl. No.: 875,040

[52] U.S. Cl. .................................. 137/608, 251/333
[51] Int. Cl. ................................................ F17d 1/00
[58] Field of Search .................. 251/333; 137/608, 27

[56] References Cited

UNITED STATES PATENTS

| | | | |
|---|---|---|---|
| 1,265,953 | 5/1918 | Pittman | 137/608 X |
| 1,664,909 | 4/1928 | Thomson | 137/608 |
| 2,447,510 | 8/1948 | Langdon | 251/333 X |
| 3,090,596 | 5/1963 | Gifford | 251/333 |
| 3,092,141 | 6/1963 | Stark | 137/608 |
| 3,117,587 | 1/1964 | Willinger | 137/608 X |
| 3,298,396 | 1/1967 | Gressman et al. | 137/608 X |

FOREIGN PATENTS OR APPLICATIONS

| | | | |
|---|---|---|---|
| 1,145,450 | 3/1963 | Germany | 251/264 |
| 1,174,467 | 3/1959 | France | 251/274 |

Primary Examiner—Samuel Scott
Attorney—Fulwider, Patton, Rieber, Lee & Utecht

[57] ABSTRACT

An aquarium gang valve including a manifold formed with an inlet chamber and a plurality of through stem-receiving bores leading therefrom. The bores are formed along their inner portions with reduced-in-diameter valve seats and on their outer extremities with internally threaded sections. The manifold includes outlet ports which are in communication with the respective bores. A plurality of elongated valve stems are inserted in the respective bores and are formed on their axially outer lengths with externally threaded portions for engagement with the internally threaded bore portions. The valve stems include resilient poppets on their inner ends for engagement with the respective seats whereby the stems may be screwed inwardly in the respective bores to engage the respective poppets with the respective seats to gradually deform the poppets and progressively decrease the airflow past the respective seats to thereby provide for relatively fine metering of air to the outlet ports. Frictional grommets may be disposed concentric with the axially outer ends of the stems for providing resistance to turning of the stems to maintain such stems at their desired settings.

1 Claims, 5 Drawing Figures

PATENTED FEB 22 1972 3,643,694
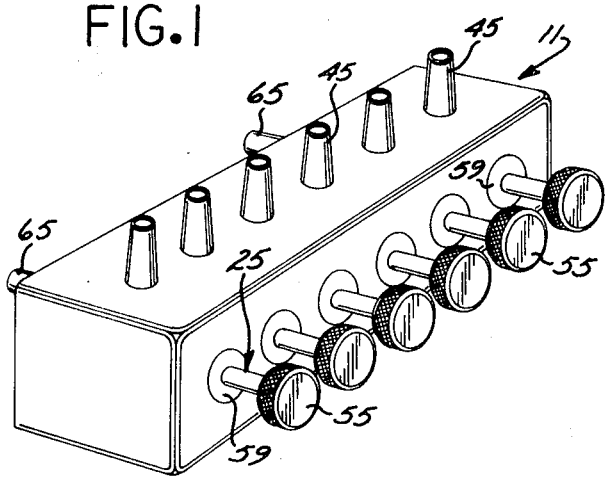
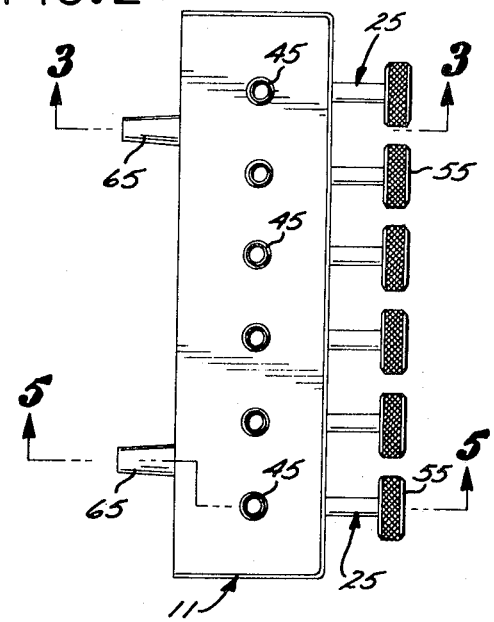
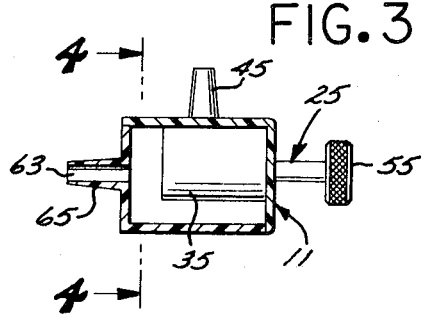
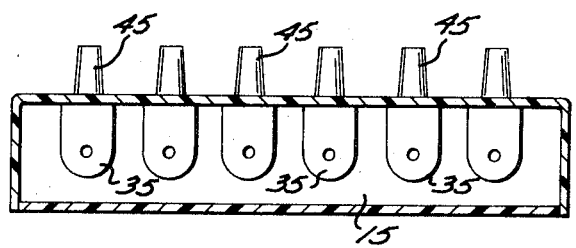
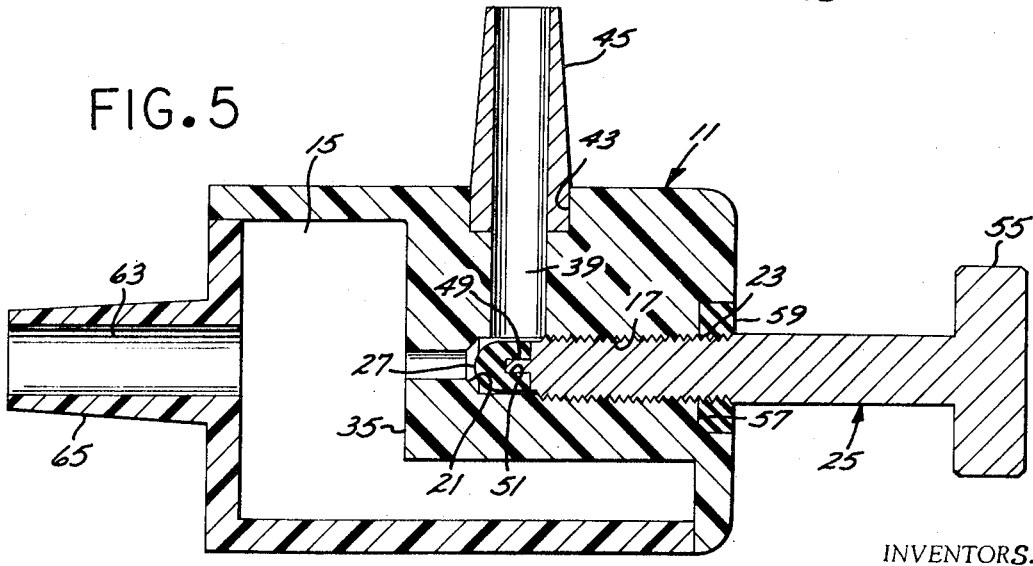
INVENTORS.
BERNARD DUKE
DAVID V. LEVENSOHN
BY Fulwider, Patton, Rieber,
Lee and Utecht
ATTORNEYS

AQUARIUM GANG VALVE

BACKGROUND OF THE INVENTION

1. Field of the Invention

The present invention relates generally to gang valves and more particularly to aquarium gang valves.

2. Description of the Prior Art

Prior art aquarium gang valves generally include manifolds having stem-receiving bores therein which are formed with frustoconical valve seats that are engaged by the conically shaped ends of metal valve stems inserted in such bores to thereby meter and selectively shut off flow. Gang valves of this type suffer the short-coming that when the poppets are brought into engagement with the respective seats, stoppage of airflow will be relatively abrupt thereby making it difficult, if not impossible, to attain any degree of accuracy in metering low rates of air flow.

SUMMARY OF THE INVENTION

The aquarium gang valve of present invention is characterized by a manifold formed with an inlet chamber having a plurality of through stem-receiving bores leading therefrom and formed on their axially inner portions with reduced-in-diameter valve seats. The bores are formed on their outer extremities with internally threaded sections and are in communication with outlet ports formed by the manifold. A plurality of elongated valve stems are provided for insertion in the bores and are externally threaded along their outer lengths for engagement with the internally threaded sections of the bores. The valve stems include resilient poppets on their axially inner ends for engagement with the respective seats whereby the stems may be screwed inwardly in the bores to engage the respective poppets with the respective seats to gradually deform such poppets and progressively meter the airflow rate past such seats.

An object of the present invention is to provide an aquarium gang valve of the type described which will provide for convenient positive shut off.

Another object of the present invention is to provide an aquarium gang valve of the type described which includes grommets around the stems to prevent accidental rotation thereof.

These and other objects and the advantages of the present invention will become apparent from a consideration of the following detailed description when taken in conjunction with the accompanying drawing.

DESCRIPTION OF THE DRAWING

FIG. 1 is a perspective view of an aquarium gang valve embodying the present invention;

FIG. 2 is a bottom plan view of the aquarium gang valve shown in FIG. 1;

FIG. 3 is a vertical sectional view taken along the line 3—3 of FIG. 2;

FIG. 4 is a vertical sectional view taken along the line 4—4 of FIG. 3; and

FIG. 5 is a vertical sectional view, in enlarged scale, taken along the line 5—5 of FIG. 2.

DESCRIPTION OF THE PREFERRED EMBODIMENT

The aquarium gang valve of present invention includes a plastic manifold, generally designated 11, which is formed with an elongated inlet chamber 15 (FIG. 5) having a plurality of stem-receiving bores 17 leading therefrom. The inner portion of the bores 17 are reduced-in-diameter to form frustoconical valve seats 21 and the outer portions of such bores are threaded for engagement by the threaded axially outer portions 23 of respective stainless steel valve stems, generally designated 25. The axially inner extremities of the stems 25 carry resilient dome shaped poppets 27 which are slightly smaller in diameter than the bores 17 to provide for airflow therearound when they are unseated. When the respective stems 25 are screwed inwardly in the bores 17 the poppets 27 engage the respective seats 21 to throttle airflow past the respective seats. Screwing of the stems 21 further into the bores 17 will deform the poppets 27 thereby progressively forming a closer fit with the respective seats 21 to thereby gradually decrease airflow past such seats until such airflow is fully shut off.

Referring to FIGS. 3 and 4, the manifold 11 is formed with a plurality of interior bosses 35 disposed in the inlet chamber 15 and formed with the through bores 23. Extending transversely from the intermediate portion of each one of the bores 23 are outlet ports 39 which are formed on their outer ends with countersunk recesses 43 which receive stainless steel nipples 45. The nipples 45 are tapered for convenient receipt of distribution hoses (not shown) leading to respective air operated elements included in an aquarium (not shown).

The inner extremities of the respective valve stems 25 are formed with axially projecting reduced-in-diameter pegs which are received in complimentally shaped, open ended axial passages 51 formed in the respective poppets 27 for convenient mounting of such poppets. It is noted that the poppets 27 are only slightly smaller in diameter than the bores 17 whereby when such poppets slip off the pegs 49 during retraction of the stems they will rest in the respective bores 17 with the passage 51 maintained in alignment for receipt of the respective pegs 49 when the respective stems 25 are next screwed in for closing the particular valve.

The axially outer extremity of the respective stems 25 are formed with knurled heads 55 for convenient grasping to rotate the respective stems. The front wall of the manifold 11 is formed with countersunk cavities 57 which are arranged concentrically with the outer ends of the stem-receiving bores 17 for receipt of press fit rubber washers 59 which are held in position for frictionally resisting turning of the respective stems 25.

Referring to FIGS. 2 and 5, the manifold 11 is formed with a pair of inlet ports 63 leading from the inlet chamber 15 and extending outwardly in respective frusto-conical nipples 65 which may be connected to hoses (not shown) leading to aquarium pumps for air supply.

In operation, the aquarium gang valve of present invention may be utilized for receiving air from a pair of aquarium pumps for distribution to a plurality of air operated elements disposed in an aquarium (not shown). The inlet nipples 65 are connected with the respective pumps by means of hoses (not shown) and such pumps are operated to pressurize the inlet chamber 15. Separate distribution hoses are then connected with each of the outlet nipples 45 for distributing air to the respective air operated elements.

The respective stem knobs 55 are then grasped and the stems 25 rotated to selectively adjust the position of the respective poppets 27 with respect to the seats 21 for the desired airflow to the particular air operated element. In this regard, it will be noted that when the stems 25 are screwed inwardly in the respective bores 17 the dome shaped end of the respective poppets 27 will engage the respective seats 21 thereby throttling airflow out the respective outlet ports 39. Gradual screwing of the stems 27 further inwardly in the respective bores 17 will gradually deform the respective poppets 27 to progressively form a closer fit with the respective seats 21 to progressively reduce the flow rate out the respective outlet ports until airflow is fully stopped. Consequently, rather fine metering is provided at the relatively low-airflow rates required by many of the conventional air operated elements used in aquariums.

Once the stem 25 for a particular air operative element is adjusted, the rubber grommet 59 concentric with the outer portion thereof will prevent the respective stems 25 from walking axially inwardly or outwardly within the respective bores 17 as a result of vibration of the manifold by vibration-type air pumps.

From the foregoing detailed description it will be apparent that applicants' have provided an aquarium gang valve which may conveniently be used for distribution of air from an aquarium air pump to a plurality of different air operated elements which require different rates of flow. The resilient poppet provides for fine metering of the airflow at relatively low-flow rates.

Various modifications and changes may be made with regard to the foregoing without departing from the spirit of the invention.

What we claim is:

1. An aquarium gang valve comprising:
   a manifold formed with an inlet chamber having an inlet port and a plurality of continuous through, stem-receiving bores leading from said chamber, and formed on their axially inner portions with reduced-in-diameter valve seats and on their outer extremities with internally threaded sections and said outer extremities terminating in a coaxial countersunk cavity, said manifold, further, including outlet ports in communication with the outer portion of the respective bores;
   a plurality of elongated valve stems for insertion in said bores and externally threaded along their axially outer lengths for engagement with said internally threaded sections and including axially projecting mounting pegs on their inner ends;
   a rubber grommet press-fitted into each of said countersunk cavities that frictionally engage said respective stems to resist accidental rotation thereof; and
   a plurality of resilient poppets of smaller cross section size than the cross section of said bores and including axial passages receiving said respective mounting pegs and frictionally retaining said poppets whereby said stems may be screwed inwardly in said respective bores to engage said respective poppets with said respective seats to gradually deform said poppets and progressively reduce the rate of airflow between said respective poppets and seats to thereby provide relatively fine metering of air to the respective outlet ports and if any of said poppets accidentally disengages its mounting peg during retraction of a stem the cross section of such disengaged poppet will be sufficient to maintain the axial passage of such poppet aligned with the disengaged mounting peg so that when the retracted stem is screwed back toward the valve closed position the disengaged stem and poppet will be reengaged.

* * * * *